E. P. FENN.
Feed-Water Heaters and Filters.
No. 158,411. Patented Jan. 5, 1875.
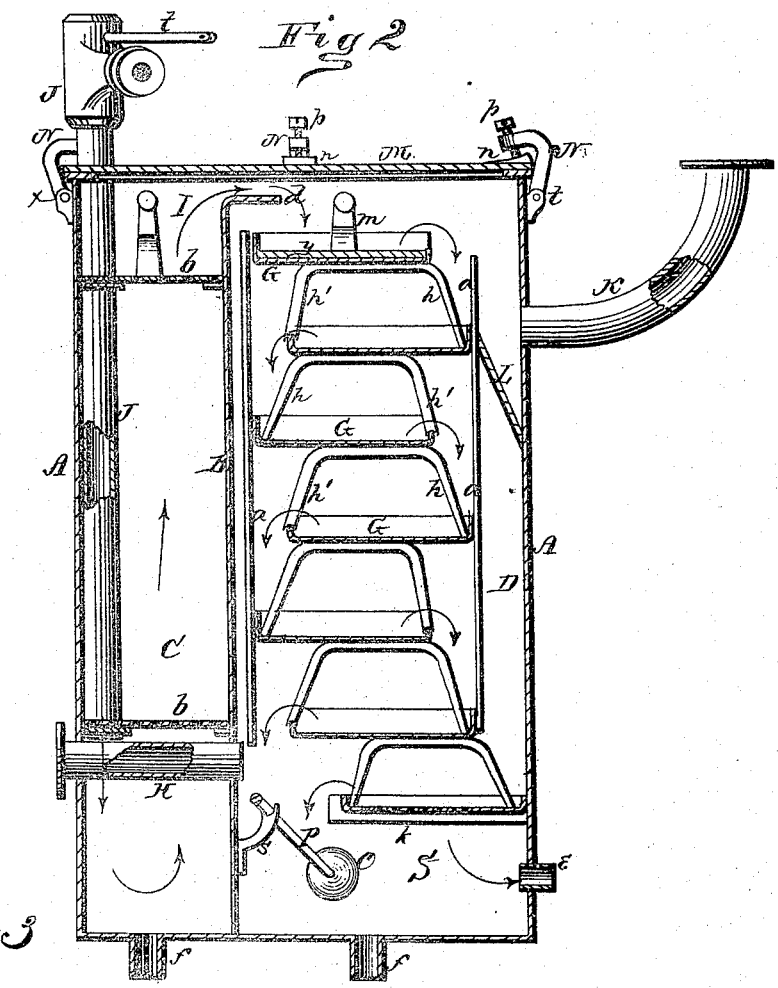
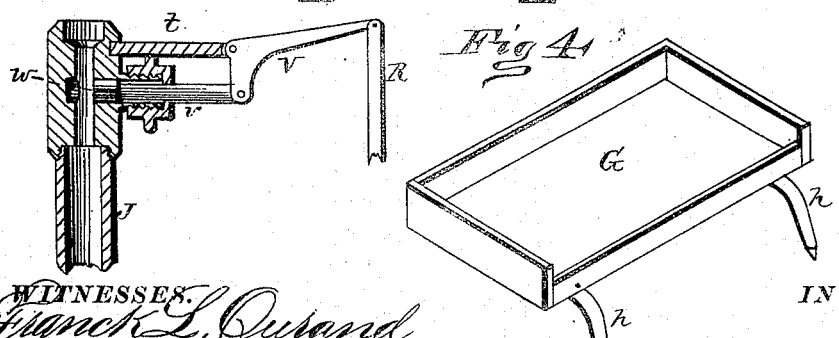
WITNESSES:
Franck L. Durand
C. L. Evert
INVENTOR
E. P. Fenn,
By Alexander ———
Attorneys.

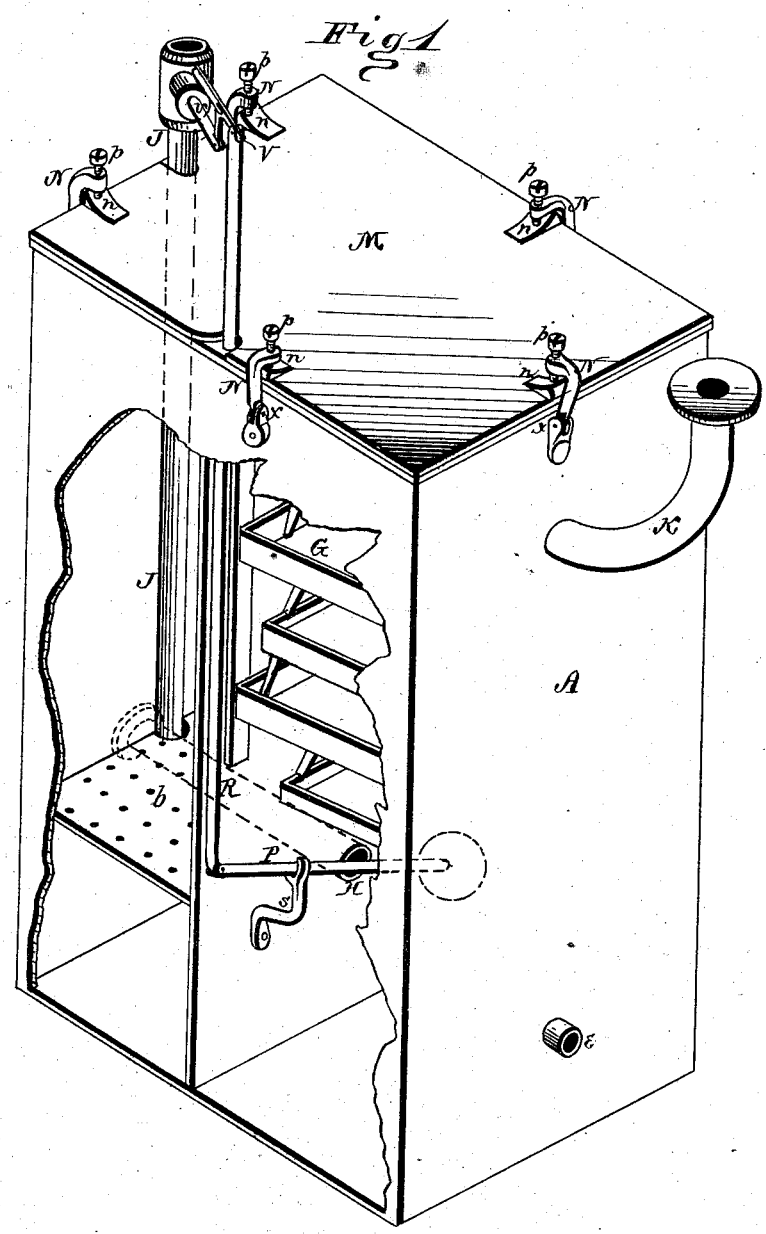

UNITED STATES PATENT OFFICE.

EDWARD P. FENN, OF KANSAS CITY, MISSOURI.

IMPROVEMENT IN FEED-WATER HEATERS AND FILTERS.

Specification forming part of Letters Patent No. 158,411, dated January 5, 1875; application filed June 5, 1874.

*To all whom it may concern:*

Be it known that I, E. P. FENN, of Kansas City, in the county of Jackson and in the State of Missouri, have invented certain new and useful Improvements in Feed-Water Heaters and Filters; and do hereby declare that the following is a full, clear, and exact description thereof, reference being had to the accompanying drawings and to the letters of reference marked thereon, making a part of this specification.

My present invention is intended as an improvement upon the feed-water heater for which Letters Patent No. 147,624 were granted to me February 17, 1874; and the nature of my invention consists in the construction and arrangement of the parts, as more fully hereinafter set forth.

In order to enable others skilled in the art to which my invention appertains to make and use the same, I will now proceed to describe its construction and operation, referring to the annexed drawings, in which—

Figure 1 is a perspective view of a feed-water heater embodying my improvements. Fig. 2 is a longitudinal vertical section of the same, and Figs. 3 and 4 are detached views of certain parts thereof.

A represents the shell of my feed-water heater, divided by a vertical partition, B, into a receiving-chamber, C, and heating-chamber D, the lower part of the heating-chamber forming the reservoir S. G G are the pans, arranged in the heating-chamber D. In the receiving-chamber C are two screens, $b\ b$, between which the filtering material is to be placed, and below the lower screen is the inlet-pipe H, for the exhaust steam from the engine. Above the upper screen $b$ is formed a chamber, I, from which the water is discharged into the pans G over a dam or flange, $d$, the water flowing in a broad sheet the entire length of the top pan. J is the receiving-pipe passing through the filtering material into the receiving-chamber C, directly on the steam-inlet pipe H. K is the escape-pipe for the exhaust steam after having passed through the sheet of water overflowing the pans. $e$ is the hot-water pipe supplying the pump and boilers. $ff$ are mud-pipes, for discharging mud or water from the receiving-chamber C and heating-chamber D. All these parts, with the exception of the pans G and escape-pipe K, are constructed and arranged substantially in the same manner as described in my former patent, above referred to. The pans G G are arranged one above the other, and every alternate pan reversed, so that the water will flow backward and forward from the first pan directly into the back part of the second pan, and so on throughout the entire series, as shown by arrows in Fig. 2, each pan reversing the direction of the flow of water from the one above it. This arrangement enables the pans to occupy less space than in my former patent, where they were arranged in step form. The pans are held between two guides, $a\ a$, which are cast or riveted to the inside of the heater-shell. The front legs, $h$, of each pan rest in the back corners of the pan below, bracing the back of each pan firmly to the guide $a$, against which it rests. The back leg, $h'$, of each pan rests upon the front edge of the one below. The bottom pan rests upon brackets $k$, and all the pans are held firmly down by means of cam-levers $m$, operating against the inside of the bottom of the upper pan. The steam-escape pipe K passes out from the shell A opposite the second pan. Under this steam-outlet, and directly beneath said second pan from the top, is placed a steam-director, L, which crosses the heater from side to side. This shuts off the steam from escaping directly upward, and forces it to pass back under this second pan, through the sheet of water falling from this pan, and upward against the sheets of water flowing from the first pan and from the chamber I, thus imparting greater heat to the water as it enters the heater, and securing greater condensation of steam. M represents the lid or lids of the heater and filter, which are held down by screw-clamp fastenings, as hereinafter described, whereby I dispense with the tedious unscrewing and frequent loss of bolts, and also leave the rim upon which the lids rest unobstructed for steam-packing. By their use the lids may be much more quickly removed than by the usual fastenings. These screw-clamp fastenings may be of any desired number, and each is constructed in the following manner: N is a link or bar, jointed or hinged at $x$ to a projection on the side of the heater, just below the rim thereof. Near the upper end this link or bar is bent forward, so as to form an acute angle, and is provided with a set-screw, $p$, which operates upon a raised surface, $n$, on the lid M. This raised surface is at an angle with the lid, but parallel with the upper arm of the link, so that the axial line of the screw and its point of contact with the raised surface are in line with the joint $x$ of the link below, thereby pressing the lid firmly down upon the rim. O represents a float attached to one end of a lever, P, within the reservoir S, said lever being pivoted to an arm, $s$, and the other end of the lever pivoted to the lower end of a rod, R, passing vertically up through the lid M, as shown in Fig. 1. The upper end of the rod R is pivoted to one end of an elbow-lever, V, which is pivoted at its angle to an arm, $t$, projecting from the feed-pipe J. The other arm of this elbow-lever is connected with a valve-stem, $v$, passing through a barrel formed on the side of the pipe J, and on the inner end of said stem is a valve, $w$, to close the feed-pipe when moved inward.

As the water in the reservoir S rises to the high-water line the float O is raised, and depresses the opposite end of the lever P, which also pulls down the rod R and the elbow-lever V. This in turn operates directly upon the valve to close it, and shut off the supply of water. As the water is drawn from the reservoir the reverse of the above action on the levers is caused by the float dropping with the water, the valve opens, and the supply of water is renewed.

It is well known that water is frequently found containing substances in solution which have no affinity for the iron surfaces heretofore employed in this class of feed-water heaters. Under these circumstances the pans or plates in use fail to retain any, or at best but a very small proportion, of the incrustating substances from the water. My object, in this improvement, is to substitute for iron surfaces in such cases surfaces of other material, selecting in each particular case such material as presents the greatest affinity for the peculiar substance held in solution. My experiments have proved that different kinds of wood and that zinc will collect with great rapidity substances which will not adhere to iron. Examples of such woods are oak, hemlock, and the various varieties of linn woods. This I consider probably due to the tannin and other acids contained in the woods, and, where zinc is substituted, to the galvanic action induced. I therefore in such cases substitute for the iron pans those constructed of some kind of wood or of zinc, as an analysis of the water or experiments may indicate to be requisite in any particular case; or the original pans may be lined with the required material, as shown at $y$ in Fig. 2. This I consider a very important part of my invention, as I am thus enabled to operate this class of feed-water heaters successfully, where heretofore they have utterly failed to prevent incrustation of boilers.

Having thus fully described my invention, what I claim as new, and desire to secure by Letters Patent, is—

1. The combination, with the pans G, of the guides $a$, brackets $k$, feet $h$ $h'$, and cam-levers $m$, substantially as and for the purposes herein set forth.

2. The combination of the shell A, pans G G, steam-inlet H, steam-outlet K, and the steam-director L, said steam-director being arranged, with relation to the steam-outlet and the pans, substantially as and for the purposes herein set forth.

3. The combination, with the shell A and lid M, of a series of screw-clamp fastenings, each consisting of the bent link or bar N, hinged or jointed at $x$, the set-screw $p$, and inclined raised surface $n$, all constructed and arranged substantially as and for the purposes herein set forth.

In testimony that I claim the foregoing I have hereunto set my hand this 2d day of June, 1874.

EDWARD P. FENN.

Witnesses:
 C. L. EVERT,
 J. H. RIEGER.